US008513328B2

United States Patent
Dorman

(10) Patent No.: US 8,513,328 B2
(45) Date of Patent: Aug. 20, 2013

(54) FLUID APPLIED SILICONE AIR AND WATER BARRIER SYSTEM AND PROCESS THEREOF

(75) Inventor: Gene E. Dorman, Corona, CA (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 13/289,799

(22) Filed: Nov. 4, 2011

(65) Prior Publication Data

US 2013/0023602 A1   Jan. 24, 2013

Related U.S. Application Data

(60) Provisional application No. 61/411,222, filed on Nov. 8, 2010, provisional application No. 61/411,198, filed on Nov. 8, 2010.

(51) Int. Cl.
*C08L 83/04* (2006.01)
*C08K 5/098* (2006.01)

(52) U.S. Cl.
USPC .......................................... 523/122; 524/400

(58) Field of Classification Search
None
See application file for complete search history.

(56) References Cited

U.S. PATENT DOCUMENTS

| | | | |
|---|---|---|---|
| 3,689,454 | A | 9/1972 | Smith et al. |
| 3,779,986 | A | 12/1973 | Smith et al. |
| 3,821,218 | A | 6/1974 | Berger |
| 4,100,129 | A | 7/1978 | Beers |
| 4,438,039 | A | 3/1984 | Beers et al. |
| 4,483,973 | A | 11/1984 | Lucas |
| 4,528,353 | A | 7/1985 | Lucas |
| 5,990,257 | A | 11/1999 | Johnston et al. |
| 6,197,912 | B1 | 3/2001 | Huang et al. |
| 2005/0054765 | A1 | 3/2005 | Putzer |

FOREIGN PATENT DOCUMENTS

| EP | 676403 B1 | 9/1999 |
|---|---|---|
| WO | WO2001/42365 A1 | 6/2001 |

OTHER PUBLICATIONS

International Search Report and Written Opinion of the International Searching Authority, 12 pages, Jan. 18, 2012.

*Primary Examiner* — Robert S Loewe

(74) *Attorney, Agent, or Firm* — Dominick G. Vicari; Kenneth S. Wheelock

(57) ABSTRACT

There is provided herein a one-part room temperature vulcanizing (RTV) silicone based air and water barrier composition comprising silanol-terminated diorganopolysiloxane polymer; fumed silica; stearic acid treated ground calcium carbonate extending filler; polyalkoxy crosslinking agent; metal chelate condensation cure catalyst; and, an adhesion promoter. There is also provided a wall assembly comprising said composition.

14 Claims, 6 Drawing Sheets

5A

5B

5C

5D

6A

6B

6C

FLUID APPLIED SILICONE AIR AND WATER BARRIER SYSTEM AND PROCESS THEREOF

This application claims priority to Provisional U.S. Patent Application Nos. 61/411,222 and 61/411,198, the entire contents of which are incorporated herein by reference in their entirety.

FIELD OF THE INVENTION

The present invention relates to silicone based air and water barrier compositions and barrier systems utilizing the same. The present invention is also directed to items of construction, particularly wall assemblies, comprising the silicone air and water barrier system of the present invention.

BACKGROUND OF THE INVENTION

Any publications or references discussed herein are presented to describe the background of the invention and to provide additional detail regarding its practice. Nothing herein is to be construed as an admission that the inventors are not entitled to antedate such disclosure by virtue of prior invention.

New and remedial construction projects utilize a myriad of air and water barriers systems in order to keep the structures dry and free from drafts. These barrier systems are manufactured from components that are mostly incompatible with silicone weather sealants and often do not allow for sustainable adhesion of the commonly used silicone weather sealant. This often adds cost to jobs by requiring additional labor and adding complexities to the design architect in order to provide a weather-tight building.

In addition, the air and water barriers available on the market have limited ultraviolet exposure time before they need to be covered, removed, or re-applied. This also adds to the costs of a remolding and/or new construction. Accordingly, what is needed is a silicone air and water barrier composition/system that is compatible with silicone compositions, can be easily applied, has enhanced water and air sealing characteristics and is not as sensitive to ultraviolet light as other sealants available on the market today.

SUMMARY OF THE INVENTION

The present invention provides a fluid applied silicone based composition for use in construction as air and water one-part and barrier system that satisfies the deficiencies that exist in current state-of-the-art products and technologies.

The present invention is directed to a one-part room temperature vulcanizing (RTV) silicone based air and water barrier composition comprising:

about 20 weight percent (wt. %) to about 80 wt. %, of silanol-terminated diorganopolysiloxane polymer having a viscosity between about 100 centipoise to about 500,000 centipoise at about 25 degrees Celsius)(C.°) wherein the organo groups are monovalent hydrocarbon radicals containing up to about 30 carbon atoms;

up to about 20 wt. % of a treated fumed silica reinforcing filler;

up to about 60 wt. % of at least one of a stearic acid treated ground calcium carbonate extending filler; and, a precipitated calcium carbonate filler about 0.5 wt. % to about 10 wt. % of a polyalkoxy crosslinking agent having the general formula:

$$(R^1O)_{4-a}-Si-R^2_a$$

where $R^1$ and $R^2$ are monovalent hydrocarbon radicals of up to about 30 carbon atoms, and a is zero or an integer that varies such that the viscosity of the polymer varies from about 100 to about 500,000 centipoise at 25 C.°;

up to about 0.05 wt. % to about 5 wt. % of a metal chelate condensation cure catalyst having the general formula:

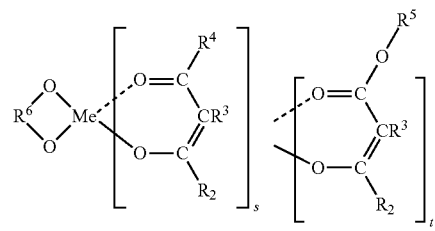

where Me is a metal selected from the group consisting of lead, tin, zirconium, antimony, iron, cadmium, barium, manganese, zinc, cobalt, nickel, aluminum, gallium, germanium and titanium, s is from about 0.7 to about 1.3, and t is from 1.2 to 0.8, $R^6$ is a divalent hydrocarbon radical containing from about 2 to about 20 carbon atoms optionally substituted with a hydrocarbon group containing up to 8 carbon atoms, $R^2$ is hydrogen or an organic radical selected from the group consisting of hydrocarbyl, halohydrocarbyl and acyl each containing up to about 8 carbon atoms, $R^3$ is hydrogen or an organic radical selected from the group consisting of hydrocarbyl, halohydrocarbyl and acyl containing up to about 8 carbon atoms, or $R^3$ is part of a cyclic hydrocarbon group formed by a bond to a carbon atom of the adjacent $R^2$ and/or $R^3$ group wherein the cyclic hydrocarbon group contains up to about 12 carbon atoms and is optionally substituted with one or more functional groups selected from the group consisting of chloro, nitro, ester, cyano, and carboxy ester substituents, $R^4$ is defined the same as $R^2$;

$R^5$ is a monovalent organic radical selected from the group consisting of hydrocarbyl, halohydrocarbyl and ether containing up to 60 carbon atoms, cyanoalkyl containing up to 12 carbon atoms, amino, and polyether groups of the formula $(C_qH_{2q}O)_vR^{30}$, where q is from 2 to 4, and v is from 1 to 20, and $R^{30}$ is a monovalent hydrocarbon radical of from 1 to 30 carbon atoms;

up to about 5 wt. % of an adhesion promoter selected from the group consisting of an organofunctional polyalkoxy silane adhesion promoter having the general formula:

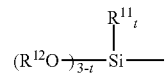

where $R^{11}$ and $R^{12}$ are monovalent hydrocarbon radicals containing up to about 8 carbons, t is 0 to 3 and Z is a saturated, unsaturated, or aromatic hydrocarbon which is further functionalized by a group selected from the group consisting of ether, epoxy, isocyanato, cyano, acryloxy, and acyloxy; an isocyanato-functional polyalkoxy silane adhesion promoter of the general formula:

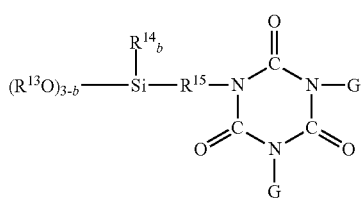

wherein G is selected from $R^{11}$ radicals as defined above, styryl, vinyl, allyl, chloroallyl, cyclohexenyl, and radicals of the formula

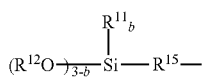

wherein $R^{11}$ and $R^{12}$ are monovalent hydrocarbon radicals containing up to about 8 carbon atoms, where $R^{13}$ is a monovalent hydrocarbon radical containing up to about 8 carbon atoms or a monovalent cyanoalkyl radical containing up to about 8 carbon atoms, and wherein $R^{15}$ is a divalent hydrocarbon radical selected from the group consisting of alkylenearylene, alkylene, and cycloalkylene and halogenated alkylenearylene, alkylene, and cycloalkylene each containing from 2 to about 12 carbon atoms, and where b is 0 or an integer from 1 to about 2; and, combinations thereof.

Another embodiment herein is directed to a wall assembly comprising the silicone polymer composition described herein.

The present invention is further described in the detailed description section including the examples provided below.

DESCRIPTION OF THE INVENTION

Figure 1:
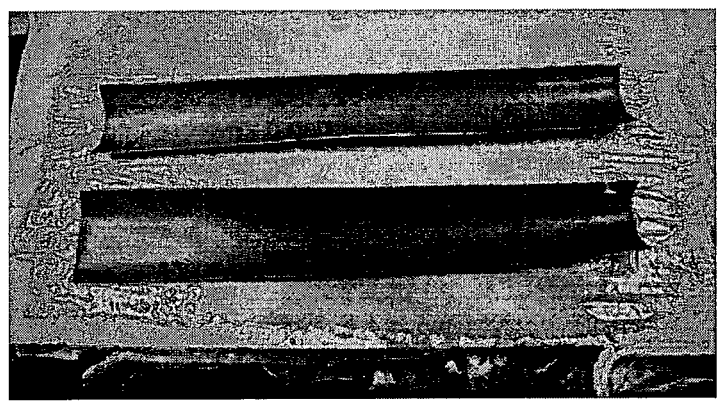
FIG. 1 is a view of a red and a grey heat cure elastomer adhered to a glass fiber sheathing substrate using a silicone coating material.

The present invention is directed to a one-part room temperature vulcanizing (RTV) silicone polymer composition for use as a fluid applied silicone air and water barrier system. The water and air barrier system of the present invention has superior sealant properties over other sealants available on the market. The one-part room temperature vulcanizing (RTV) silicone polymer composition herein (sealant composition) adheres to standard silicone weather stripping used universally in construction making it easier to use than other sealants that are not compatible with standard weather stripping. The compatibility of the present composition along with the superior properties it exhibits reduces the cost of construction and improves protection of a building from adverse weather conditions. The composition and its uses are further described in greater detail below.

As used herein, "homopolymers" are polymers made from the same repeating monomer and 'copolymers" are polymers wherein the polymer contains at least two structurally different monomers. Notations such as (meth)acrylate denote monomer with either acrylate or methacrylate functionality.

Also, as used in the specification and including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

One embodiment of the present invention is directed to a one-part room temperature vulcanizing (RTV) silicone based air and water barrier composition that is curable in the presence of moisture.

A general description of each of the components of the one-part RTV composition for use as a sealant composition is provided below.

The air and water barrier sealant composition herein comprises the following components: (1) about 20 wt. % to 80 wt. %, specifically about 25 wt. % to about 75 wt. %, and more specifically about 30 wt. % to about 50 wt. % of a silanol-terminated diorganopolysiloxane polymer having a viscosity varying from about 100 centipoise to about 500,000 centipoise at about 25 C.°, where the organo groups are monovalent hydrocarbon radicals containing up to about 60 carbon atoms.

In one specific embodiment the viscosity of the silanol-terminated diorganopolysiloxane polymer varies from about 1,000 centipoise to about 20,000 centipoise at 25 C.°, and in a even more specific embodiment the viscosity ranges from about 2,000 centipoise to about 10,000 centipoise at 25 C.°.

The organo group in the silanol-terminated diorganopolysiloxane polymer can be a monovalent hydrocarbon radical, for example, alkyl radicals containing from 1 to about 8 carbon atoms, such as the non-limiting embodiments of methyl, ethyl, propyl, etc; cyclo alkyl radicals such as the non-limiting embodiments of cyclopentyl, cyclohexyl, and so forth; alkenyl such as the non-limiting embodiments of vinyl, allyl and so forth; mononuclear aryl radicals such as the non-limiting embodiments such as phenyl, methylphenyl, ethylphenyl, and so forth; and fluoroalkyl radicals such as the non-limiting embodiment of 3,3,3-trifluoropropyl. In one-non-limiting embodiment, the silanol-terminated diorganopolysiloxane polymer can have only one terminus being silanol with the other terminus being a monovalent hydrocarbon radical as described above.

In one specific non-limiting embodiment the silanol-terminated diorganopolysiloxane polymer can have the generic formula (I):

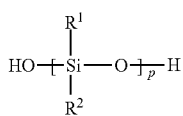

(I)

where $R^1$ and $R^2$ are monovalent hydrocarbon radicals of from 1 to about 12 carbon atoms, and where "p" varies such that the viscosity of the polymer varies from about 100 centipoise to about 500,000 centipoise at 25 C.°, and more specifically, at 1,000 centipoise to about 20,000 centipoise at 25 C.°, and even more specifically from about 2,000 centipoise to about 10,000 centipoise at 25 C.°. In a specific embodiment the value of p in formula (I) can be from 1 to about 4,000, more specifically from about 10 to about 1000, and most specifically from about 100 to about 500.

The $R^1$ and $R^2$ groups of formula (I) may be the same or different and are generally selected from the same groups as the monovalent hydrocarbon radicals defined above for the organo groups of the silanol-terminated diorganopolysiloxane polymer. Specifically, at least about 50% of the total number of $R^1$ and $R^2$ radicals are alkyl radicals containing from 1 to about 8 carbon atoms, and any remaining $R^1$ and $R^2$ radicals are aryl radicals. More specifically, at least about 75% of the total number of $R^1$ and $R^2$ radicals are alkyl radicals containing from 1 to about 8 carbon atoms, and any remaining $R^1$ and $R^2$ radicals are aryl radicals. Most specifically, at least about 50% of the total number of $R^1$ and $R^2$ radicals are alkyl radicals containing from 1 to about 8 carbon atoms, and any remaining $R^1$ and $R^2$ radicals are aryl radicals.

In an even more specific embodiment, at least about 50% of the total number of $R^1$ and $R^2$ radicals are methyl radicals and the remaining are aryl radicals such as phenyl radicals. In another embodiment herein the $R^1$ and $R^2$ radicals are selected from alkyl radicals containing from 1 to about 8 carbon atoms such as methyl or a mixture of alkyl radicals containing from 1 to about 8 carbon atoms and fluoroalkyl radicals such as 3,3,3-trifluoropropyl.

The air and water barrier sealant composition herein further comprises (2) up to about 20 wt. %, specifically from 1 wt. % to about 15 wt. %, and most specifically from about 3 wt. % to about 10 wt. % of a treated fumed silica reinforcing filler.

In one embodiment herein the treated fumed silica reinforcing filler is a fumed silica that has been treated with cyclic siloxanes, such as D4 and/or with silazanes, such as hexamethyldisilazane (HMDZ), as is well known in the art.

The air and water barrier sealant composition herein further comprises (3) up to about 60 wt. %, specifically from about 10 wt. % to about 50 wt. %, and most specifically from about 25 wt. % to about 45 wt. % of at least one of a stearic acid treated ground calcium carbonate extending filler; and, a precipitated calcium carbonate filler.

The air and water barrier sealant composition herein further comprises (4) about 0.5 wt. % to about 10 wt. %, specifically from about 1.0 wt. % to about 5 wt. %, and most specifically from about 1.5 wt. % to about 3.0 wt. % of a polyalkoxy crosslinking agent having the general formula (II):

(II)

where $R^1$ and $R^2$ are as defined in formula (I) where "a" can be 0, 1, or 2.

Particular compounds that fall within the scope of formula (II) are selected from the group consisting of methyltrimethoxysilane, vinyltrimethoxysilane, tetramethoxysilane, methyltriethoxysilane, vinyltrimethoxysilane and tetraethoxysilane. In a most specific embodiment, the polyalkoxy silane crosslinking agent is methyltrimethoxysilane.

The air and water barrier sealant composition herein further comprises (5) from about 0.05 wt. % to about 5 wt. %, specifically, from about 0.1 wt. % to about 3.0 wt. % and most specifically from about 0.5 wt. % to about 2.0 wt. % of a titanium chelate condensation cure catalyst having the general formula (III):

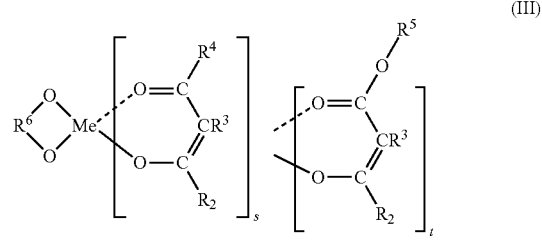

(III)

wherein Me, $R^2$, $R^3$, $R^4$, $R^5$, $R^6$, s and t are as defined above.

In formula (III), "s" is in the range of about 0.7 to about 1.3. In one specific embodiment herein "s" is from about 0.8 to about 1.2 and t is from about 1.2 to about 0.8, in a most specific embodiment s is equal to 1, and t is equal to 1. In one particular embodiment of the present invention, the composition contains a titanium chelate wherein $R^6$ is propylene and $R^3$ is hydrogen, $R^2$ and $R^4$ are methyl and $R^5$ is ethyl.

In one embodiment, $R^6$ is a divalent hydrocarbon radical containing from about 2 to about 20 carbon atoms and may be substituted with a hydrocarbon group of up to 8 carbon atoms, including halohydrocarbon groups and carboxyl groups and, in addition to hydrocarbon substituent groups, the non-terminal moieties of the $R^6$ group may include other substituent groups such as at least one of a halogen, cyano, nitro, carboxy ester and acyl group.

In one specific non-limiting embodiment, the total number of carbon atoms in the $R^6$ group does not exceed about 20 carbon atoms. The preparation of compounds of formula (III) are described in U.S. Pat. Nos. 3,689,454 and 3,779,986 both of which are incorporated herein by reference.

Most specifically the titanium chelate catalyst herein is represented by the structure (IV):

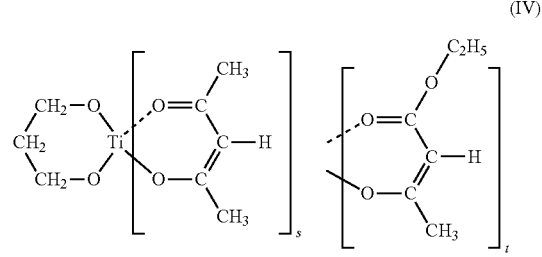

(IV)

where, most specifically "s" and "t" are 1.

The air and water barrier sealant composition herein further comprises 6) up to about 5 wt. %, specifically from about 0.1 wt. % to about 2.0 wt. %, and most specifically from about 0.2 wt. % to about 0.7 wt. % of an organofunctional polyalkoxysilane adhesion promoter having the general formula (V):

wherein $R^{11}$ and $R^{12}$ are monovalent hydrocarbon radicals containing up to about 8 carbon atoms, t is 0 to about 3 and Z is a saturated, unsaturated, or aromatic hydrocarbon of up to about 30 carbon atoms, specifically about 12 carbon atoms, more specifically about 8 carbon atoms, which is further functionalized by a group selected from the group consisting of amino, ether, epoxy, glycidoxy, isocyanato, cyano, acryloxy, methacryloxy and acyloxy.

Adhesion promoting compounds, within the scope of formula (V), and suitable for use herein, as well as methods for preparing them, are disclosed, for example, in U.S. Pat. Nos. 4,483,973; 4,528,353; 3,821,218 and 4,100,129 each of which are incorporated herein by reference.

In addition to, or alternatively to compounds of the formula (V), the air and water barrier sealant composition herein can alternatively, or in addition, comprise an isocyanato-functional polyalkoxy silane adhesion promoter.

Isocyanato-functional polyalkoxy silane adhesion promoters suitable for use herein have the general formula (VI):

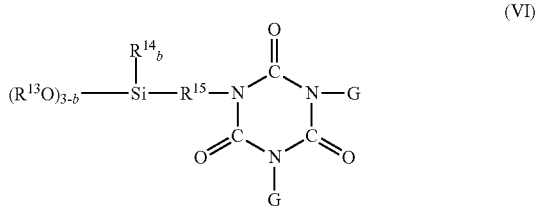

wherein G is selected from $R^{11}$ radicals as defined above, styryl, vinyl, allyl, chloroallyl, cyclohexenyl, and radicals having the general formula (VII)

where $R^{11}$ and $R^{12}$ are as defined above, and $R^{15}$ is a divalent hydrocarbon radical selected from alkylenearylene, alkylene, cycloalkylene and halogenated alkylenearylene each containing from 2 to about 12 carbon atoms, where b varies from 0 to about 3.

wherein $R^{13}$ and $R^{14}$ are each either a monovalent hydrocarbon radical containing up to about 8 carbon atoms or a monovalent cyanoalkyl radical containing up to 8 carbon atoms, wherein $R^{15}$ is as defined above, and where b varies from 0 to about 3.

Most specifically the adhesion promoter within the scope of formula (VI) is 1,3,5-tristrimethoxysilylpropylisocyanurate. This compound can be prepared by taking the corresponding alkoxy hydride silane and reacting it with the unsaturated isocyanurate or cyanurate in the presence of a platinum catalyst whereupon the hydride adds on to the unsaturated group such as the allyl group of the isocyanurate nucleus.

Other specific compounds within the scope of formula (VI) above are selected from the group consisting of bis-1,3-trimethoxysilylpropylisocyanurate; 1,3,5-tristrimethoxysilylethylisocyanurate; 1,3,5-trismethyldimethoxysilylpropylisocyanurate; and 1,3,5-trismethyldiethoxysilylpropylisocyanurate, and combinations thereof.

The isocyanato-functional alkoxysilane adhesion promoter of formula (VI) can be present in the RTV compositions herein in an amount of up to about 2.0 wt. %, specifically from about 0.1 wt. % to about 1.0 wt. %, and most specifically from about 0.3 wt. % to about 0.7 wt. %.

In one non-limiting embodiment, the air and water barrier sealant composition herein can comprise adhesion promoters selected from the group consisting of 1,3,5-tristrimethoxysilylpropylisocyanurate, bis-1,3-trimethoxysilylpropylisocyanurate, 1,3,5-tristrimethoxysilylethylisocyanurate, 1,3,5-trismethyldimethoxysilylpropylisocyanurate, 1,3,5-trismethyldiethoxysilylpropylisocyanurate, n-2-aminoethyl-3-aminopropyltriethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and combinations thereof.

The air and water barrier sealant composition herein can optionally further comprise up to about 60 wt. %, specifically from about 5 wt. % to about 40 wt. %, and most specifically from about 15 wt. % to about 25 wt. % of a hydrocarbon processing aid comprising, based on 100 parts by weight of the hydrocarbon fluid, greater than 40 parts by weight cyclic paraffinic hydrocarbons and less than 60 parts by weight noncyclic paraffinic hydrocarbons.

In one specific embodiment of the present invention, the hydrocarbon fluid comprises one or more cyclic paraffinic hydrocarbons containing about 5 to about 24 carbon atoms per molecule and, optionally, one or more non-cyclic paraffinic hydrocarbons containing from about 5 to about 24 carbons per molecule. In one specific embodiment of the present invention, the cyclic and non-cyclic hydrocarbons of the hydrocarbon fluid each contain from about 8 to about 20, more specifically, from about 10 to about 15 carbon atoms per molecule.

Suitable cyclic paraffinic hydrocarbons include, but are not limited to, cyclohexane, cyclooctane, cyclononane, cyclododecane and combinations thereof. Suitable non-cyclic paraffinic hydrocarbons include but are not limited to n-heptane, n-octane, iso-octane, n-nonane, n-decane, n-undecane, n-dodecane, iso-decane, n-heptadecane, n-octadecane, n-eicosane, isoeicosane and combinations thereof. In a specific embodiment of the composition herein, the hydrocarbon fluid comprises less than about 0.5% by weight aromatic hydrocarbons.

In one further embodiment, the air and water barrier sealant composition herein can optionally further comprise other additives including, for example, flame-retardants, fungicides, pigments, colorants, and the like.

There is also provided herein a wall assembly comprising the one-part room temperature vulcanizing (RTV) silicone based air and water barrier composition herein. The wall assembly described herein can comprise the use of the one-part room temperature vulcanizing (RTV) silicone based air and water barrier composition as an adhesive to bond elastomer material(s) to construction sheathing substrate(s), metal substrate(s) such as painted or unpainted aluminum substrates, galvanized metal substrate(s), wood framing substrate(s) and the like.

As discussed herein, the compositions of the present invention can be used in construction as a one-part room temperature vulcanizing (RTV) silicone polymer air and water sealant composition. Set forth below are various construction applications of the composition of the present invention followed by experimental data showing unexpected favorable results realized.

EXPERIMENTAL

To expand an understanding of the present invention the examples below are provided.

Example 1

The silicone coating material as the adhesive (base) to adhere a Red 0.022 inch thick and Grey 0.015 inch thick heat cure elastomer to a glass fiber sheathing substrate (DensGlass® sheathing substrate). The substrate surface was prepared in accordance with method P15. (To test the substrate(s) as received, no surface preparation=P15. To test using a natural bristle brush to remove dirt/dust debris=P9.)

The silicone coating material used comprised by weight percent:
 (a) 14.6% of a 25,000 cps silanol terminated polydimethylsiloxane polymer.
 (b) 17.9% of a 3,000 cps silanol-terminated polydimethylsiloxane polymer.
 (c) 39.0% stearic acid treated ground calcium carbonate filler;
 (d) 3.6% $D_4$ and HMDZ treated fumed silica filler (88318-MOMENTIVE)
 (e) 20.8% of a $C_{12}$-$C_{20}$ linear organic aliphatic solvent (CONOSOL C200 FROM PENRECO)
 (f) 0.47% of tris(trimethoxysilylpropyl) isocyanurate adhesion promoter;
 (g) 2.37% methyltrimethoxysilane; and,
 (h) 1.26% diisopropoxy titanium bis(acetylacetonate) cure catalyst. The silicone coating mixture was made in a continuous compounding extruder Example 1

The resulting outcome (shown in FIG. 1) exhibited curling with both the Red and Grey elastomer as the Silicone Coating material began to crosslink for the adhesive (base). Point Contact Adhesion of both the Red and Grey elastomer was observed. In this example, it was attempted to determine if the freshly "wet" applied silicone coating could be used as the adhesive (base) instead of a silicone sealant. The observation outcome resulted in both the red and grey elastomer curled to freshly "wet" applied silicone coating.

Example 2

To expand an understanding of the combination for the product(s)/detail condition, a Silicone Sealant (SCS2000) comprised of:
 (a) 34% of a 130,000 cps silanol terminated polydimethylsiloxane polymer.
 (b) 44.0% stearic acid treated ground calcium carbonate filler;
 (c) 4.5% $D_4$ treated fumed silica filler (88049-MOMENTIVE)
 (d) 14% of a linear, trimethylstopped PDMS fluid
 (e) 0.30% of tris(trimethoxysilylpropyl) isocyanurate adhesion promoter;
 (f) 2.2% methyltrimethoxysilane; and,
 (j) 1% propanediol titanium (acetylacetonate) (ethylacetoacetate) cure catalyst; was continuously mixed in a compounding extruder.

SCS2000 is a thixotropic paste and was utilized as the adhesive (base) to adhere a Red 0.022 inch thick and Grey 0.015 inch thick heat cure elastomer to a glass fiber sheathing substrate (DensGlass® sheathing substrate). The substrate surface was prepared in accordance with method P15.

Example 2

Figure 2:
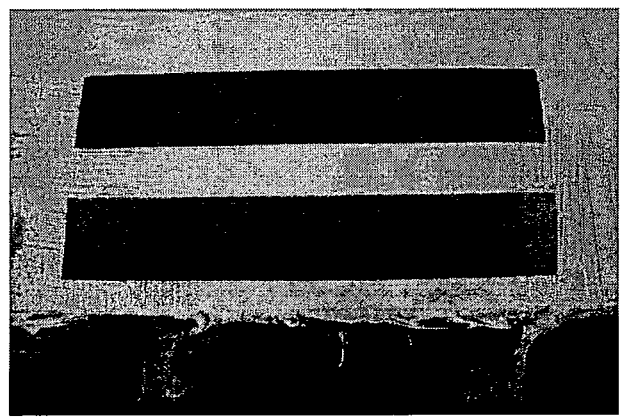
FIG. 2 is a view of a red and a grey heat core elastomer adhered to a glass fiber sheathing substrate using a neutral cure silicone sealant.

The resulting outcome (shown in FIG. 2) exhibited no curling of the Red and Grey elastomer using neutral cure Silicone Sealant as the adhesive (base) during the cure process. Full contact adhesion of both the Red and Grey elastomer was observed.

Example 3

To expand an understanding of the combination for the product(s)/detail condition, Silicone Sealant SCS2000 as described above was utilized as the adhesive (base) to adhere a Red 0.022 inch thick and Grey 0.015 inch thick heat cure elastomer at a 90 Degree Angle to a painted aluminum substrate, as pictured below (Example 3). The painted metal was used only for the purpose to have a smooth finish to ascertain if the heat cure elastomer would curl with the sealant as was observed when tested with the silicone coating. The substrate surface was prepared in accordance with method P15.

Example 3

Figure 3:
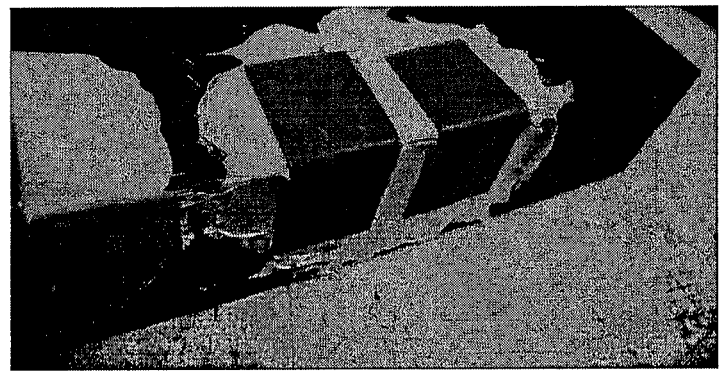
FIG. 3 is a view of a red and a grey heat cure elastomer adhered at a 90 degree angle to a painted aluminum substrate using a silicone sealant.

The resulting outcome (shown in FIG. 3) exhibited no curling of the Red and Grey elastomer using neutral cure Silicone Sealant as the adhesive (base) during the cure process. Adhesion of both the Red and Grey elastomer was observed.

Example 4

To expand an understanding for the combination of the product(s)/detail condition, one silicone coating material (SEC2400), three sealants (SilPruf SCS2000, SCS2700 and SCS9000) and MS polymer sealant (SCS7000) were utilized as the adhesive (base) to perform a (dry) adhesion test to a DensGlass® glass fiber sheathing substrate which substrate had its surface prepared in accordance with method P15 Prior to conducting adhesion pull test(s) both the coating and sealants cured for 14 days after application.

The SEC2400 formulation was given in example 1.
The SCS2000 composition was given in example 2.
The SCS2700 composition is:
 (a) 34% of a 130,000 cps silanol terminated polydimethylsiloxane polymer.
 (b) 40.0% stearic acid treated ground calcium carbonate filler;
 (c) 4.5% $D_4$ treated fumed silica filler (88049-MOMENTIVE)
 (d) 18% of a linear, trimethylstopped PDMS fluid
 (e) 0.30% of tris(trimethoxysilylpropyl) isocyanurate adhesion promoter;
 (f) 2.2% methyltrimethoxysilane; and,
 (g) 1% propanediol titanium (acetylacetonate) (ethylacetoacetate) cure catalyst. The above SCS2700 ingredients were continuously mixed in a compounding extruder.

The SCS9000 composition is:
(a) 48% of a 80,000 cps silanol and methyl terminated polydimethylsiloxane polymer.
(b) 44.0% stearic acid treated ground calcium carbonate filler;
(c) 4.5% $D_4$ treated fumed silica filler (88049-MOMENTIVE)
(d) 0.30% of tris(trimethoxysilylpropyl) isocyanurate adhesion promoter;
(e) 2.2% methyltrimethoxysilane; and,
(f) 1% propanediol titanium (acetylacetonate) (ethylacetoacetate) cure catalyst. The above SCS9000 ingredients are continuously mixed in a compounding extruder.

The SCS7000 composition is:
(a) 28.5% of a methyldimethoxysilyl terminated polyether polymer;
(b) 20% of diisodecylphthalate;
(c) 2% TiO2;
(d) 30% UltraPflex stearic acid treated precipitated calcium carbonate;
(e) 15% Hi-Pflex 100 stearic acid treated ground calcium carbonate;
(f) 3% methyltrimethoxysilane crosslinker;
(g) 1% aminoethylaminopropyltrimethoxysilane adhesion promoter; and,
(h) 0.5% solubilized dibutyltinoxide cure catalyst.

The above SCS7000 ingredients were mixed together using a 500-gallon planetary batch mixer. In one embodiment, SCS7000 was primarily tested to determine compatibility to the silicone coating SEC2400 and to determine its adhesion characteristics to the substrates tested.

Example 4

Figure 4:
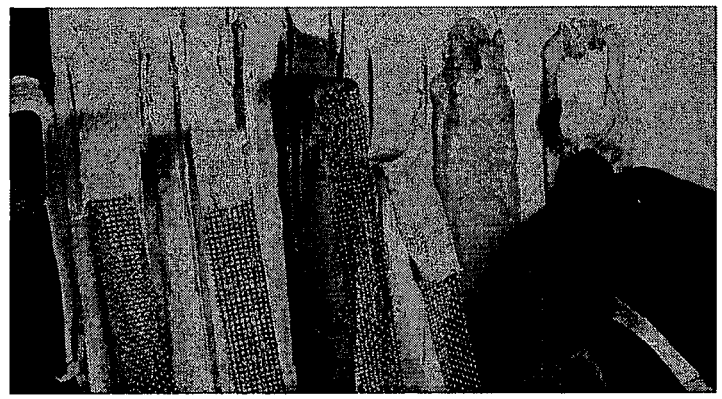
FIG. 4 is a view of the results of one silicone coating material 3 sealants and one MS polymer sealant in a dry adhesion test to a glass fiber sheathing substrate.

The resulting outcome (shown in FIG. 4) exhibited with the identified silicone coating and sealant to glass fiber sheathing substrate failed within itself. Because the bond strength of the silicone coating and the sealant was greater than the component materials of the glass fiber sheathing, hence causing the substrate to fail within itself. Adhesion was fully attained.

Example 5

Figure 5:
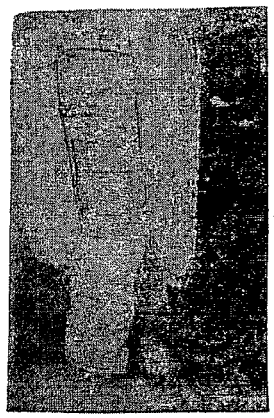
FIG. 5A-5D are views of the results of an adhesion test using a silicone coating material as the adhesive on a galvanized metal substrate.
Figure 5:
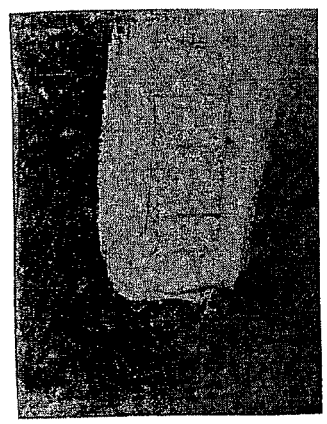
Figure 5:
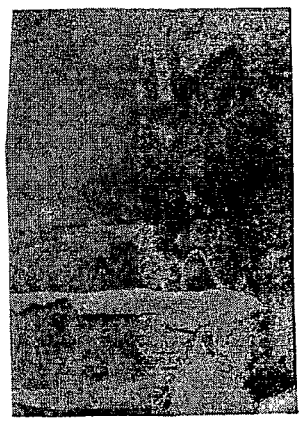
Figure 5:
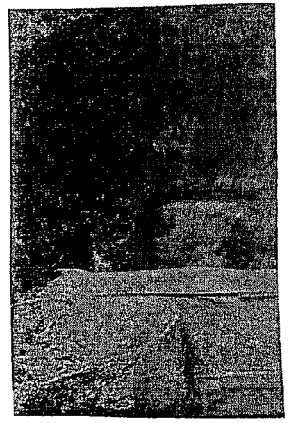

To expand an understanding for the combination of the product(s)/detail condition a silicone coating material SilShield SEC2400 was used as the adhesive to perform an adhesion test to a galvanized metal substrate. Prior to conducting adhesion pull test, the silicone coating cured for 14 days after application. The photograph in FIG. 5 shows that the adhesive bond of the silicone material(s) is stronger than the substrate itself. That is, when the sealant is tested (to see if it adheres to the underlying substrate) by pulling the sealant away from the substrate, the substrate is pulled away (the photos show yellow glass fibers in the sealant bond area).

Example 5

The silicone coating attained adhesion to the galvanized metal when it was preceded with the xylene or acetone wipe procedure. The silicone coating attained minimal or no adhesion when it was preceded by the (IPA) isopropyl alcohol wipe procedure.

The solvent wipe procedure (using the respective solvents) for galvanized metal was as follows:

Dual-Rag Solvent Wipe procedure was as follows: A rag wetted with solvent was used to wipe the surfaces. Immediately follow the wet rag wipe a clean dry rag wipe was used to carry away any contaminants that were removed/dissolved from the wet rag wipe.

The photo in FIG. 5A shows the results following the "P2-P5" procedure (a xylene wipe followed by a dry wipe as the surface cleaning preparation) and the photo in FIG. 5B shows the results following the "Ace-P5" (an acetone wipe followed by a dry wipe as the surface cleaning preparation) with cohesive failure of the silicone materials; revealing that when utilizing these cleaning preparatory steps, the adhesive bond to the underlying material (galvanized metal in this case) is stronger than the silicone material itself; tearing the silicone material during the test. This is compared to the photo in FIG. 5C, with the specimen labeled as "A" which received a "P1-P5" surface prep (isopropyl alcohol wipe followed by a dry wipe as the surface cleaning preparation). This combination of surface preparation and silicone material when tested for adhesion revealed that the silicone material released adhesively from the underlying substrate when tested (an undesirable result). The primary purpose of the silicone coating tests was to ascertain if primerless adhesion could be achieved to substrates. Specimen C in FIG. 5D was tested with Primer.

Example 6

Figure 6:
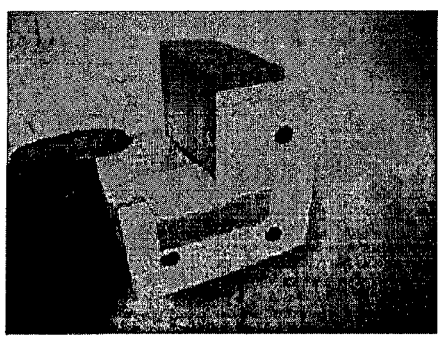
FIG. 6A-6C are views of a miniature wood stud framed mock-up utilizing a silicone sealant as the adhesive to adhere an elastomer transition strip to the wood stud framing and glass fiber sheathing substrate.
Figure 6:
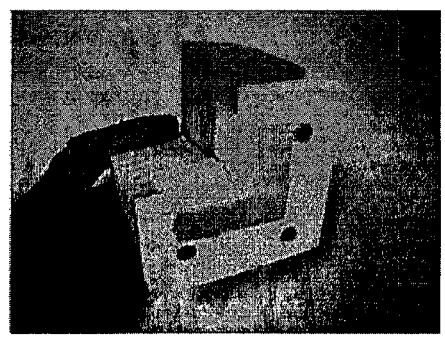
Figure 6:

To expand an understanding for the combination of the product(s)/detail condition a miniature wood stud framed mock-up utilizing a silicone sealant as the adhesive (base) to adhere an elastomer transition strip to the wood stud framing and glass fiber sheathing substrate, wherein surface preparation method P15 was preformed, to simulate a rough wall opening. As pictured below (FIGS. 6a, 6b and 6c):

Example 6

The resulting outcome exhibited consistent transition of the Silicone Sealant as the adhesive (base) to adhere the elastomer to the Wood Stud Framing and Glass Fiber Sheathing Substrate, and a Silicone Coating applied over elastomer to the Wood Stud Framing and Glass Fiber Sheathing Substrate.

Adhesion Test Results

Adhesion testing is conducted according to ASTM C 794 (modified), Adhesion in Peel of Elastomeric Joint Sealants. Testing is conducted on each substrate with and without primer for each sealant tested. Results in the table(s) below are based on 14-day ambient condition cure. Results of the substrates and sealants are shown in the table(s) below.

TABLE 1

| CA09-1583 Glass Fiber Sheathing Substrate | | | | | | | |
|---|---|---|---|---|---|---|---|
| Submitted Substrate | Cure Condition | Cure Time | Sealant | Primer | Legend (prep) | Adhesion % | Comments: |
| Glass Fiber Sheathing | RT Cure | 14 days | A2 | W/O | P9 | 90% | Adhesion observed. |
| Glass Fiber Sheathing | RT Cure | 14 days | A2 | W/O | P9 | 80% | Adhesion observed. |
| Glass Fiber Sheathing | RT Cure | 14 days | A2 | W/O | P9 | 100% | Adhesion observed. |
| Glass Fiber Sheathing | RT Cure | 14 days | A1 | W/O | P9 | 100% | Adhesion observed. |

TABLE 1-continued

CA09-1583 Glass Fiber Sheathing Substrate

| Submitted Substrate | Cure Condition | Cure Time | Sealant | Primer | Legend (prep) | Adhesion % | Comments: |
|---|---|---|---|---|---|---|---|
| Glass Fiber Sheathing | RT Cure | 14 days | A2 | W/O | P15 | 95% | Adhesion observed. |
| Glass Fiber Sheathing | RT Cure | 14 days | A2 | W/O | P15 | 85% | Adhesion observed. |
| Glass Fiber Sheathing | RT Cure | 14 days | A2 | W/O | P15 | 100% | Adhesion observed. |
| Glass Fiber Sheathing | RT Cure | 14 days | A1 | W/O | P15 | 95% | Adhesion observed. |
| Glass Fiber Sheathing | RT Cure | 14 days | A2 | SS4044P | P9 | 90% | Adhesion observed. |
| Glass Fiber Sheathing | RT Cure | 14 days | A2 | SS4044P | P9 | 80% | Adhesion observed. |
| Glass Fiber Sheathing | RT Cure | 14 days | A2 | SS4044P | P9 | 100% | Adhesion observed. |
| Glass Fiber Sheathing | RT Cure | 14 days | A1 | SS4044P | P9 | 100% | Adhesion observed. |
| Glass Fiber Sheathing | RT Cure | 14 days | A2 | SS4044P | P15 | 95% | Adhesion observed. |
| Glass Fiber Sheathing | RT Cure | 14 days | A2 | SS4044P | P15 | 85% | Adhesion observed. |
| Glass Fiber Sheathing | RT Cure | 14 days | A2 | SS4044P | P15 | 100% | Adhesion observed. |
| Glass Fiber Sheathing | RT Cure | 14 days | A1 | SS4044P | P15 | 95% | Adhesion observed. |

LEGEND
A1 = Silicone sealant SCS2000
A2 = Silicone coating SilShield SEC2400
RT Cure - 14-day ambient condition cure
W/O - without primer applied
SS4044P = Momentive Primer
P9 - natural bristle brush used on surface
P15 - as received (no surface preparation)
Legend for Adhesion Rating
0-100% percent cohesive failure
SF = substrate failure
P = pass rating adhesion Adhesion Test Results Adhesion testing is conducted to ASTM C 794 (modified), Adhesion in Peel of Elastomeric Joint Sealants. Testing is conducted on each substrate with and without primer for each sealant tested. Results in the table(s) below are typically based on 14-day ambient condition cure, 1-day water immersion and 7-day water immersion. The substrate with silicone product is completely immersed into water. After the sample has been immersed for 1 day the silicone product is assessed for adhesion values. The substrate is then placed back into water immersion for an additional 6 days for a total of 7 days water immersion from which the silicone product is assessed for adhesion values. Results of the substrates and sealants are shown in the table(s) below.

TABLE 2

CA10-1692 Galvanized Break Metal - which is sheet metal which is simply metal formed into thin and flat pieces; the metal is cleaned then coated with a galvanized treatment to prevent rust.

| Submitted Substrate | Cure Condition | Cure Time | Sealant | Primer | Legend (prep) | Adhesion % | Comments: |
|---|---|---|---|---|---|---|---|
| Galvanized Break Metal | RT Cure | 14 days | A1 | W/O | A-P5 | 90% | Adhesion observed |
| Galvanized Break Metal | 1 day water | 15 days | A1 | W/O | A-P5 | 90% | Adhesion observed. |
| Galvanized Break Metal | 7 day water | 21 days | A1 | W/O | A-P5 | 98% | Adhesion observed. |
| Galvanized Break Metal | RT Cure | 14 days | A1 | SS4044P | A-P5 | 100% | Adhesion observed. |
| Galvanized Break Metal | 1 day water | 15 days | A1 | SS4044P | A-P5 | 100% | Adhesion observed. |
| Galvanized Break Metal | 7 day water | 21 days | A1 | SS4044P | A-P5 | 100% | Adhesion observed. |
| Galvanized Break Metal | RT Cure | 14 days | A1 | W/O | P2-P5 | 90% | Adhesion observed. |
| Galvanized Break Metal | 1 day water | 15 days | A1 | W/O | P2-P5 | 100% | Adhesion observed. |

TABLE 2-continued

CA10-1692 Galvanized Break Metal - which is sheet metal which is simply metal formed into thin and flat pieces; the metal is cleaned then coated with a galvanized treatment to prevent rust.

| Submitted Substrate | Cure Condition | Cure Time | Sealant | Primer | Legend (prep) | Adhesion % | Comments: |
|---|---|---|---|---|---|---|---|
| Galvanized Break Metal | 7 day water | 21 days | A1 | W/O | P2-P5 | 100% | Adhesion observed. |
| Galvanized Break Metal | RT Cure | 14 days | A1 | SS4044P | P2-P5 | 100% | Adhesion observed. |
| Galvanized Break Metal | 1 day water | 15 days | A1 | SS4044P | P2-P5 | 100% | Adhesion observed. |
| Galvanized Break Metal | 7 day water | 21 days | A1 | SS4044P | P2-P5 | 100% | Adhesion observed. |
| Galvanized Break Metal | RT Cure | 14 days | A1 | W/O | P1-P5 | 80% | Adhesion observed. |
| Galvanized Break Metal | 1 day water | 15 days | A1 | W/O | P1-P5 | 95% | Adhesion observed. |
| Galvanized Break Metal | 7 day water | 21 days | A1 | W/O | P1-P5 | 85% | Adhesion observed. |
| Galvanized Break Metal | RT Cure | 14 days | A1 | SS4044P | P1-P5 | 100% | Adhesion observed. |
| Galvanized Break Metal | 1 day water | 15 days | A1 | SS4044P | P1-P5 | 100% | Adhesion observed. |
| Galvanized Break Metal | 7 day water | 21 days | A1 | SS4044P | P1-P5 | 100% | Adhesion observed. |
| Galvanized Break Metal | RT Cure | 14 days | A2 | W/O | A-P5 | 90% | Adhesion observed. |
| Galvanized Break Metal | 1 day water | 15 days | A2 | W/O | A-P5 | 90% | Adhesion observed. |
| Galvanized Break Metal | 7 day water | 21 days | A2 | W/O | A-P5 | 98% | Adhesion observed. |
| Galvanized Break Metal | RT Cure | 14 days | A2 | SS4044P | A-P5 | 100% | Adhesion observed. |
| Galvanized Break Metal | 1 day water | 15 days | A2 | SS4044P | A-P5 | 100% | Adhesion observed. |
| Galvanized Break Metal | 7 day water | 21 days | A2 | SS4044P | A-P5 | 100% | Adhesion observed. |
| Galvanized Break Metal | RT Cure | 14 days | A2 | W/O | P2-P5 | 90% | Adhesion observed. |
| Galvanized Break Metal | 1 day water | 15 days | A2 | W/O | P2-P5 | 100% | Adhesion observed. |
| Galvanized Break Metal | 7 day water | 21 days | A2 | W/O | P2-P5 | 100% | Adhesion observed. |
| Galvanized Break Metal | RT Cure | 14 days | A2 | SS4044P | P2-P5 | 100% | Adhesion observed. |
| Galvanized Break Metal | 1 day water | 15 days | A2 | SS4044P | P2-P5 | 100% | Adhesion observed. |
| Galvanized Break Metal | 7 day water | 21 days | A2 | SS4044P | P2-P5 | 100% | Adhesion observed. |
| Galvanized Break Metal | RT Cure | 14 days | A2 | W/O | P1-P5 | 10% | Poor adhesion observed. |
| Galvanized Break Metal | 1 day water | 15 days | A2 | W/O | P1-P5 | 0% | No adhesion observed. |
| Galvanized Break Metal | 7 day water | 21 days | A2 | W/O | P1-P5 | 35% | Poor adhesion observed. |
| Galvanized Break Metal | RT Cure | 14 days | A2 | SS4044P | P1-P5 | 100% | Adhesion observed. |
| Galvanized Break Metal | 1 day water | 15 days | A2 | SS4044P | P1-P5 | 100% | Adhesion observed. |
| Galvanized Break Metal | 7 day water | 21 days | A2 | SS4044P | P1-P5 | 100% | Adhesion observed. |

LEGEND
A1 and A2 defined as in Table 1
RT Cure - 14 Day Ambient Condition Cure
W/O - Without Primer Applied
P1 - Isopropyl Alcohol Wipe* (IPA)
P2 - Xylene Wipe
P5 - Dry Wipe
A - Acetone/Dry Wipe
Legend for Adhesion Rating
0-100% percent cohesive failure
P = Pass Rating Adhesion
F = Total Adhesive Failure

TABLE 3

CA09-1583 DensGlass ® Gold Sheathing Substrate

| Submitted Substrate | Cure Condition | Cure Time | Sealant | Primer | Legend (prep) | Force (lbs/inch) | Adhesion % | Rating | Comments: |
|---|---|---|---|---|---|---|---|---|---|
| DensGlass Gold | RT Cure | 14 days | SCS2000 | W/O | P9 | T11 | 90% | SF | Adhesion observed. |
| DensGlass Gold | RT Cure | 14 days | SCS2700 | W/O | P9 | T11 | 80% | SF | Adhesion observed. |
| DensGlass Gold | RT Cure | 14 days | SCS9000 | W/O | P9 | T11 | 100% | P | Adhesion observed. |
| DensGlass Gold | RT Cure | 14 days | SCS7000 | W/O | P9 | T11 | 98% | SF | Adhesion observed. |
| DensGlass Gold | RT Cure | 14 days | SEC2400 | W/O | P9 | T11 | 100% | P | Adhesion observed. |
| DensGlass Gold | RT Cure | 14 days | SCS2000 | W/O | P15 | T11 | 95% | SF | Adhesion observed. |
| DensGlass Gold | RT Cure | 14 days | SCS2700 | W/O | P15 | T11 | 85% | SF | Adhesion observed. |
| DensGlass Gold | RT Cure | 14 days | SCS9000 | W/O | P15 | T11 | 100% | P | Adhesion observed. |
| DensGlass Gold | RT Cure | 14 days | SCS7000 | W/O | P15 | T11 | 100% | SF | Adhesion observed. |
| DensGlass Gold | RT Cure | 14 days | SEC2400 | W/O | P15 | T11 | 95% | SF | Adhesion observed. |

RT, W/O, Adhesion %, P, P9 and P15 are as defined above.
SF = substrate failed within itself
T11 = beads of sealant/coating at a given thickness applied onto the substrate
The sealant thickness in Table 3 is approximately 0.125 inches and the coating thickness in table 4 is approximately 12 (dry) mils

TABLE 4

CA10-1692 Galvanized Break Metal

| Submitted Substrate | Cure Condition | Cure Time | Sealant | Primer | Legend (prep) | Force (lbs/inch) | Adhesion % | Rating | Comments: |
|---|---|---|---|---|---|---|---|---|---|
| Galvanized Break Metal | RT Cure | 14 days | SEC2400.04 | W/O | A-P5 | T11 | 90% | P | Adhesion observed. |
| Galvanized Break Metal | 1 day water | 15 days | SEC2400.04 | W/O | A-P5 | T11 | 90% | P | Adhesion observed. |
| Galvanized Break Metal | 7 day water | 21 days | SEC2400.04 | W/O | A-P5 | T11 | 98% | P | Adhesion observed. |
| Galvanized Break Metal | RT Cure | 14 days | SEC2400.04 | W/O | P2-P5 | T11 | 90% | P | Adhesion observed. |
| Galvanized Break Metal | 1 day water | 15 days | SEC2400.04 | W/O | P2-P5 | T11 | 100% | P | Adhesion observed. |
| Galvanized Break Metal | 7 day water | 21 days | SEC2400.04 | W/O | P2-P5 | T11 | 100% | P | Adhesion observed. |
| Galvanized Break Metal | RT Cure | 14 days | SEC2400.04 | W/O | P1-P5 | T11 | 10% | F | Poor adhesion observed. |
| Galvanized Break Metal | 1 day water | 15 days | SEC2400.04 | W/O | P1-P5 | T11 | 0% | F | No adhesion observed. |
| Galvanized Break Metal | 7 day water | 21 days | SEC2400.04 | W/O | P1-P5 | T11 | 35% | F | Poor adhesion observed. |
| Galvanized Break Metal | RT Cure | 14 days | SCS2000 | W/O | P1-P5 | 38.0 | 80% | P | Adhesion observed. |
| Galvanized Break Metal | 1 day water | 15 days | SCS2000 | W/O | P1-P5 | 44.0 | 95% | P | Adhesion observed. |
| Galvanized Break Metal | 7 day water | 21 days | SCS2000 | W/O | P1-P5 | 42.0 | 85% | P | Adhesion observed. |

RT, W/O, Adhesion %, P, P1, P2, P5 and T11 are as defined above.
SEC2400.04 = SEC2400 with the .04 portion of SEC2400.04 indicating a limestone color.

Test Methods

The test specimens were evaluated in accordance with the following methods:

ASTM D 1653-03, Standard Test Methods for Water Vapor Transmission of Organic Coating Films, Wet Cup Method.

ASTM D 1970-09, Standard Specification for Self-Adhering Polymer Modified Bituminous Sheet Materials Used as Steep Roofing Underlayment for Ice Dam Protection, Self Sealability Test.

ASTM E 2178-03, Standard Test Method for Air Permeance of Building Materials. The test specimens were evaluated in general accordance with the following methods: ASTM D 4541-09, Standard Test Method for Pull-Off Strength of Coatings Using Portable Adhesion Testers.

ASTM D7234-05, Standard Test Method for Pull-Off Adhesion Strength of Coatings on Concrete Using Portable Pull-Off Adhesion Testers.

Product: SilShield AWB Silicone Air & Water Barrier Coating (SilShield AWB)=SEC2400.

TABLE 5

SilShield AWB at 17 mil Dry Thickness

| Parameter | Test Result |
|---|---|
| Water Vapor Permeance ASTM D 1653-03 | 5.5 perms |
| Self sealability around nails ASTM D 1979-09 | Pass |

TABLE 6

SilShield AWB at 12 mil Dry Thickness

| Parameter | Test Results |
|---|---|
| Water vapor permeance ASTM D 1653-03 | 8.4 perms |
| Self sealability around nails ASTM D 1979-09 | Fail |
| Calculated air permeance at 25 Pa ASTM E 2178-03 | <0.00001 L/Pa·m²·s |
| Calculated air permeance at 50 Pa ASTM E 2178-03 | <0.00001 L/Pa·m²·s |
| Calculated air permeance at 75 Pa ASTM E 2178-03 | <0.00001 L/Pa·m²·s |
| Calculated air permeance at 100 Pa ASTM E 2178-03 | <0.00001 L/Pa·m²·s |
| Calculated air permeance at 150 Pa ASTM E 2178-03 | <0.00001 L/Pa·m²·s |
| Calculated air permeance at 300 Pa ASTM E 2178-03 | <0.00001 L/Pa·m²·s |
| Tensile Stress at Maximum Load- Dens-Glass Substrate* | 33.1 psi |
| Tensile Stress at Maximum Load- Concrete Substrate | 112.1 psi |

*Full strength of silicone not realized due to the failure of Dens-Glass substrate prior to coating failure.

Test Procedures and Test Results: The results are reported in the following tables. All test conditions were at standard laboratory conditions unless otherwise noted.

Water Vapor Permeance—Wet Cup Method

The test specimen film was secured between two gaskets to a water-filled aluminum test dish. The resulting open area of each test specimen for testing was 1.8 in².

The weights of the test specimens were recorded once a day during normal business days utilizing a Mettler Toldeo AX504 Balance (ICN 003449). The lab environmental conditions were recorded at the same time. The permeance was calculated in accordance with the test method. The test for tables 7-8 was done under ASTM D 1653-03.

TABLE 7

SilShield AWB - 17 mil Dry Thickness

| Test Specimen | Average Temperature, °C. (°F.) | Average Relative Humidity, % | Permeance, perms |
|---|---|---|---|
| 1 | 20.8 (69.4) | 48.1 | 5.5 |
| 2 | 20.8 (69.4) | 48.1 | 4.7 |
| 3 | 20.8 (69.4) | 48.1 | 6.3 |
| Average | | | 5.5 |

TABLE 8

SilShield AWB - 12 mil Dry Thickness

| Test Specimen | Average Temperature, °C. (°F.) | Average Relative Humidity, % | Permeance, perms |
|---|---|---|---|
| 1 | 20.8 (69.4) | 48.1 | 8.0 |
| 2 | 20.8 (69.4) | 48.1 | 8.9 |
| 3 | 20.8 (69.4) | 48.1 | 8.4 |
| Average | | | 8.4 |

Self Sealability

The SilShield AWB coating was applied to 12"×12"×3/8" thick APA Grade, Exposure 1 pieces of plywood. The ASTM D 1970-09 test was performed with a water depth of 5" and at 4° C.±2° C. (40° F.±5° F.) for a period of three days then the test specimens were observed for water leakage.

TABLE 9

SilShield AWB - 17 mil Dry Thickness

| Test Specimen | Observations | Pass/Fail |
|---|---|---|
| 1 | No water in tub under test specimen, on nail shanks, on underside of plywood or between plywood and SilShield AWB | Pass |
| 2 | No water in tub under test specimen, on nail shanks, on underside of plywood or between plywood and SilShield AWB | Pass |

TABLE 10

SilShield AWB - 12 mil Dry Thickness

| Test Specimen | Observations | Pass/Fail |
|---|---|---|
| 1 | Water in tub under test specimen, and between plywood and SilShield AWB; no water on nail shanks or on underside of plywood | Fail |
| 2 | Water in tub under test specimen, on nail shanks, on underside of plywood and between plywood and SilShield AWB | Fail |

Air Permeance

The SilShield AWB coating was applied to ½" thick Dens-Glass. The test specimen was then prepared according to the method ASTM E 2178-03 utilizing self-adhesive gaskets and 4 mil thick polyethylene sheeting and placed SilShield AWB coated side up on top of the test chamber (ICN 004933). The test specimen was tightly secured to the top of the test chamber utilizing a metal frame with a 1 meter×1 meter interior dimension to expose 1 meter×1 meter of the test specimen. The frame was secured by several pressure clamps.

The test specimen was then tested at preset air pressures ranging from 25 Pa to 300 Pa. Upon completion of the cycle, the polyethylene sheet was sliced and peeled away from the test specimen's surface. The test specimen was tested again at preset air pressures ranging from 25 Pa to 300 Pa. The calculated flow rate column in the table immediately below table 11 is an average of the measured flow rates of specimens 1-5 at each respective air pressure in table 11. Likewise, the calculated air permeance column in the table immediately below table 11 is the mathematical product of the average of the inverse of measured actual pressures for each of specimens 1-5.

TABLE 11

SilShield AWB - 12 mil Dry Thickness

| Air Pressure, Pa | Measured Flow Rate, L/(s·m²) Test Specimen | | | | |
|---|---|---|---|---|---|
| | 1 | 2 | 3 | 4 | 5 |
| 25 | <0.00001 | <0.00001 | <0.00001 | <0.00001 | <0.00001 |
| 50 | <0.00001 | <0.00001 | <0.00001 | <0.00001 | <0.00001 |
| 75 | <0.00001 | <0.00001 | <0.00001 | <0.00001 | <0.00001 |
| 100 | <0.00001 | 0.000009 | <0.00001 | <0.00001 | <0.00001 |
| 150 | <0.00001 | 0.00030 | <0.00001 | <0.00001 | <0.00001 |
| 300 | <0.00001 | 0.00029 | 0.00018 | 0.00006 | <0.00001 |

| Air Pressure, Pa | Calculated Flow Rate, L/(s·m²) | Calculated Air Permeance, L/(Pa·m²·s) |
|---|---|---|
| 25 | <0.00001 | <0.00001 |
| 50 | <0.00001 | <0.00001 |
| 75 | <0.00001 | <0.00001 |

TABLE 11-continued

SilShield AWB - 12 mil Dry Thickness

| | | |
|---|---|---|
| 100 | 0.00002 | <0.00001 |
| 150 | 0.00006 | <0.00001 |
| 300 | 0.00011 | <0.00001 |

Error Analysis: Meaningful regression analysis could not be performed due to the very low permeance through the test specimens. The majority of the measured flow rates of the test specimens were lower than the corresponding measured flow rates thus resulting in a negative calculated permeance.

Air Permeance (Continued)
Dens-Glass Only (One Specimen)

| Air Pressure, Pa | Measured Flow Rate, L/(s · m$^2$) | Calculated Air Permeance, L/(Pa · m$^2$ · s) |
|---|---|---|
| 25 | 0.00335 | 1.34E−4 |
| 50 | 0.00726 | 1.45E−4 |
| 75 | 0.01150 | 1.53E−4 |
| 100 | 0.01495 | 1.50E−4 |
| 150 | 0.02242 | 1.49E−4 |
| 300 | 0.04488 | 1.50E−4 |

Note:
The air leakage of the Dens-Glass does not exceed 0.02 L/(s · m$^2$) at a pressure differential of 75 Pa for regular gypsum board as outlined in Section 8.1.2 of ASTM E2178-03. The actual pressure and flow values are presented in Appendix A.

APPENDIX A

Test Specimen Actual Pressure and Flow Values

| Target Pressure, Pa | Actual Pressure, Pa | Actual Flow, L/s |
|---|---|---|
| Appendix A Test Specimen 1 | | |
| *Tare (Leakage)* | | |
| 25 | 25.10370 | 0.00115 |
| 50 | 50.11327 | 0.00173 |
| 75 | 74.81364 | 0.00247 |
| 100 | 99.82074 | 0.00289 |
| 150 | 150.18632 | 0.00400 |
| 300 | 300.31243 | 0.00653 |
| *Test* | | |
| 25 | 24.93956 | 0.00064 |
| 50 | 50.06867 | 0.00151 |
| 75 | 75.36660 | 0.00195 |
| 100 | 100.09791 | 0.00284 |
| 150 | 149.82711 | 0.00364 |
| 300 | 300.03640 | 0.00643 |
| Appendix A Test Specimen 2 | | |
| *Tare (Leakage)* | | |
| 25 | 24.94161 | 0.00150 |
| 50 | 50.20697 | 0.00254 |
| 75 | 75.19572 | 0.00372 |
| 100 | 99.66818 | 0.00451 |
| 150 | 149.47475 | 0.00594 |
| 300 | 301.16027 | 0.01030 |
| *Test* | | |
| 25 | 25.02425 | 0.00142 |
| 50 | 49.90279 | 0.00248 |
| 75 | 75.01252 | 0.00362 |
| 100 | 100.39615 | 0.00460 |
| 150 | 149.70303 | 0.00624 |
| 300 | 301.03016 | 0.01059 |
| Appendix A Test Specimen 3 | | |
| *Tare (Leakage)* | | |
| 25 | 24.94980 | 0.00184 |
| 50 | 50.16573 | 0.00264 |
| 75 | 75.14905 | 0.00384 |
| 100 | 100.38617 | 0.00493 |
| 150 | 150.10671 | 0.00639 |
| 300 | 300.02593 | 0.01076 |
| *Test* | | |
| 25 | 25.04859 | 0.00133 |
| 50 | 50.18470 | 0.00263 |
| 75 | 75.30957 | 0.00383 |
| 100 | 100.07077 | 0.00464 |
| 150 | 150.05679 | 0.00630 |
| 300 | 300.47623 | 0.01094 |
| Appendix A Test Specimen 4 | | |
| *Tare (Leakage)* | | |
| 25 | 24.93848 | 0.00349 |
| 50 | 50.11862 | 0.00540 |
| 75 | 74.64652 | 0.00754 |
| 100 | 100.17459 | 0.00919 |
| 150 | 149.89230 | 0.01292 |
| 300 | 300.96119 | 0.02123 |
| *Test* | | |
| 25 | 25.06189 | 0.00273 |
| 50 | 50.20727 | 0.00517 |
| 75 | 75.12398 | 0.00711 |
| 100 | 99.96632 | 0.00919 |
| 150 | 150.04643 | 0.01272 |
| 300 | 300.65762 | 0.02129 |
| Appendix A Test Specimen 5 | | |
| *Tare (Leakage)* | | |
| 25 | 25.12002 | 0.00084 |
| 50 | 50.07670 | 0.00122 |
| 75 | 75.35053 | 0.00174 |
| 100 | 100.28851 | 0.00214 |
| 150 | 149.52513 | 0.00288 |
| 300 | 300.08907 | 0.00445 |
| *Test* | | |
| 25 | 25.05494 | 0.00031 |
| 50 | 50.20336 | 0.00071 |
| 75 | 75.19595 | 0.00127 |
| 100 | 100.07904 | 0.00189 |
| 150 | 150.11995 | 0.00239 |
| 300 | 300.14558 | 0.00412 |
| Appendix A Dens-Glass Only | | |
| *Tare (Leakage)* | | |
| 25 | 24.96279 | 0.00187 |
| 50 | 49.90708 | 0.00326 |
| 75 | 75.18611 | 0.00407 |
| 100 | 99.63309 | 0.00547 |
| 150 | 149.91431 | 0.00746 |
| 300 | 301.29634 | 0.01351 |
| *Test* | | |
| 25 | 25.03834 | 0.00522 |
| 50 | 49.80435 | 0.01052 |
| 75 | 74.64378 | 0.01557 |
| 100 | 99.80172 | 0.02042 |
| 150 | 150.01917 | 0.02988 |
| 300 | 300.26842 | 0.05839 |

Pull-Off Strength

The SilShield AWB coating was applied to ½" thick Dens-Glass and CMU (Concrete Masonry Unit). After the SilShield AWB coating had cured for two weeks, 1" by 1" t-blocks were adhered to the test specimens with GE SilPruf SCS2003 silicone rubber sealant. The CMU test specimens were scored through the SilShield AWB to the substrate before testing. SCS2003 is the same as SCS2000 in example 2 but contains 3% carbon black colorant.

The tensile strength was determined utilizing an Instron Model 3369 Universal Test Machine (ICN 005740) operating at a cross head speed of 150 psi/s for the Dens-Glass substrate and 30 psi/s for the CMU substrate. The data in Table 12 was obtained under test method ASTM D 4541-09 and the data in Table 13 was obtained under test method ASTM D7234-05. The stress strain results are easily calculated since the test patch is one inch square—the force is divided by the area, the square of one is one—the calculated result is simply the force divided by one and the average values are simply the sum of the tests divided by the number of individual tests.

TABLE 12

SilShield AWB Applied on Dens-Glass - 12 mil Dry Thickness

| Test Specimen | Maximum Load (lbs) | Tensile Stress at Maximum Load (psi) | Comments |
|---|---|---|---|
| 1 | 52.99 | 53.0 | Peeled face off Dens-Glass |
| 2 | 29.77 | 29.8 | Peeled face off Dens-Glass |
| 3 | 32.26 | 32.3 | Peeled face off Den-Glass and SCS2003 had cohesive failure |
| 4 | 20.15 | 20.2 | Peeled face off Dens-Glass |
| 5 | 30.12 | 30.1 | Peeled face off Dens-Glass |
| Average | 33.06 | 33.1* | |

*Full strength of silicone not realized due to the failure of Dens-Glass substrate prior to coating failure.

TABLE 13

SilShield AWB applied on CMU - 12 mil Dry Thickness

| Test Specimen | Maximum Load (lbs) | Tensile Stress at Maximum Load (psi) | Comments |
|---|---|---|---|
| 1 | 116.56 | 116.6 | 50% failure at the coating/substrate interface |
| 2 | 104.31 | 104.3 | 25% failure at the coating/substrate interface |
| 3 | 108.86 | 108.9 | 25% failure at the coating/substrate interface |
| 4 | 113.82 | 113.8 | 40% failure at the coating/substrate interface |
| 5 | 116.79 | 116.8 | 30% failure at the coating/substrate interface |
| Average | 112.07 | 112.1 | |

Conditions for Table 14 and FIG. 7
Test Speed=150.00000 psi/s
Lab Conditions=70.2° F./48.4% R.H.
Frame=INSTRON 3369/005740
Load Cell 2 kN/005742

TABLE 14

| | Measured Values | | | | | |
|---|---|---|---|---|---|---|
| | Specimen ID | Width (in) | Thickness (in) | Maximum Load (lbf) | Tensile stress at Maximum Load (psi) | Comment |
| 1 | SEC2400 SilShield | 1.00 | 1.00 | 52.99 | 53.0 | Peeled face off Dens-Glass |
| 2 | SEC2400 SilShield | 1.00 | 1.00 | 29.77 | 29.8 | Peeled face off Dens-Glass |
| 3 | SEC2400 SilShield | 1.00 | 1.00 | 32.26 | 32.3 | Peeled face off Dens-Glass and SCS200 had cohesive failure |
| 4 | SEC2400 SilShield | 1.00 | 1.00 | 20.15 | 20.2 | Peeled face off Dens-Glass |
| 5 | SEC2400 SilShield | 1.00 | 1.00 | 30.12 | 30.1 | Peeled face off Dens-Glass |
| Mean | | 1.00 | 1.00 | 33.06 | 33.1 | |
| Standard Deviation | | 0.00 | 0.00 | 12.08 | 12.08 | |

The tensile stress data in Table 14 can be plotted against tensile strain (in/in) and the results for specimens 1-5. The data in Table 14 was obtained under test method ASTM D 4541-09 and the data in Table 15 was obtained under test method ASTM D7234-05

Conditions for Table 15 and FIG. 8
Test Speed=30.00000 psi/s
Lab Conditions=70.2° F./48.4% R.H.
Frame=INSTRON 3369/005740
Load Cell 2 kN/005742

TABLE 15

Measured Values

| Specimen ID | Width (in) | Thickness (in) | Maximum Load (lbf) | Tensile stress at Maximum Load (psi) | Comment |
|---|---|---|---|---|---|
| 1 SEC2400 SilShield-Concrete | 1.00 | 1.00 | 116.56 | 116.6 | 50% failure at the coating/substrate interface |
| 2 SEC2400 SilShield-Concrete | 1.00 | 1.00 | 104.31 | 104.3 | 25failure at the coating/substrate interface |
| 3 SEC2400 SilShield-Concrete | 1.00 | 1.00 | 108.86 | 108.9 | 25failure at the coating/substrate interface |
| 4 SEC2400 SilShield-Concrete | 1.00 | 1.00 | 113.82 | 113.8 | 40failure at the coating/substrate interface |
| 5 SEC2400 SilShield-Concrete | 1.00 | 1.00 | 116.79 | 116.8 | 30failure at the coating/substrate interface |
| Mean | 1.00 | 1.00 | 112.07 | 112.1 | |
| Standard Deviation | 0.00 | 0.00 | 5.39 | 5.39 | |

The tensile stress data in Table 15 can be plotted against tensile strain (in/in) and the results for specimens 1-5 are shown in FIG. 8

While the invention has been described with reference to a specific embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A wall assembly comprising a one-part room temperature vulcanizing (RTV) silicone based air and water barrier adhesive composition comprising:

about 20 wt. % to about 80 wt. %, of silanol-terminated diorganopolysiloxane polymer having a viscosity between about 100 centipoise to about 500,000 centipoise at about 25 C.° wherein the organo groups are monovalent hydrocarbon radicals containing up to about 30 carbon atoms;

up to about 20 wt. % of a treated fumed silica reinforcing filler;

up to about 60 wt. % of at least one of a stearic acid treated ground calcium carbonate extending filler; and, a precipitated calcium carbonate filler;

about 0.5 wt. % to about 10 wt. % of a polyalkoxy crosslinking agent having the general formula:

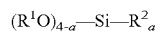

where $R^1$ and $R^2$ are monovalent hydrocarbon radicals of up to about 30 carbon atoms, and a is zero, 1 or 2;

about 0.05 wt. % to about 5 wt. % of a metal chelate condensation cure catalyst having the general formula:

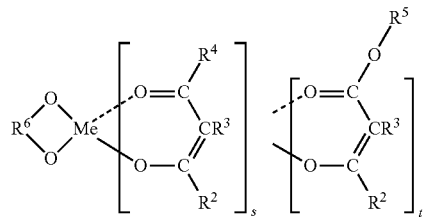

where Me is a metal selected from the group consisting of lead, tin, zirconium, antimony, iron, cadmium, barium, manganese, zinc, cobalt, nickel, aluminum, gallium, germanium and titanium, s is from about 0.7 to about 1.3, and t is from 1.2 to 0.8, $R^6$ is a divalent hydrocarbon radical containing from about 2 to about 20 carbon atoms, optionally substituted with a hydrocarbon group containing up to 8 carbon atoms, $R^2$ is hydrogen or an organic radical selected from the group consisting of hydrocarbyl, halohydrocarbyl and acyl each containing up to about 8 carbon atoms, $R^3$ is hydrogen or an organic radical selected from the group consisting of hydrocarbyl, halohydrocarbyl and acyl containing up to about 8 carbon atoms, or $R^3$ is part of a cyclic hydrocarbon group formed by a bond to a carbon atom of the adjacent $R^2$ and/or $R^3$ group wherein the cyclic hydrocarbon group contains up to about 12 carbon atoms and is optionally substituted with one or more functional groups selected from the group consisting of chloro, nitro, ester, cyano, and carboxy ester substituents;

$R^4$ is defined the same as $R^2$;

$R^5$ is a monovalent organic radical selected from the group consisting of hydrocarbyl, halohydrocarbyl and ether containing up to 60 carbon atoms, cyanoalkyl containing up to 12 carbon atoms, amino, and polyether groups of the formula $(C_qH_{2q}O)_vR^{30}$, where q is from 2 to 4, and v is from 1 to 20, and $R^{30}$ is a monovalent hydrocarbon radical of from 1 to 30 carbon atoms;

up to about 5 wt. % of an adhesion promoter selected from the group consisting of an organofunctional polyalkoxy silane adhesion promoter having the general formula:

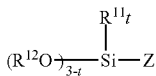

where $R^{11}$ and $R^{12}$ are monovalent hydrocarbon radicals containing up to about 8 carbon atoms, t is 0 to 3 and Z is a saturated, unsaturated, or aromatic hydrocarbon containing up to about 30 carbon atoms, which is further functionalized by a group selected from the group consisting of ether, epoxy, isocyanato, cyano, acryloxy, and acyloxy; an isocyanato-functional polyalkoxy silane adhesion promoter of the general formula:

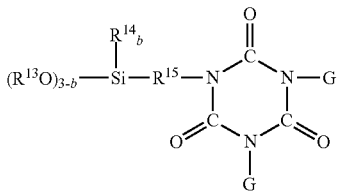

wherein G is selected from $R^{11}$ radicals as defined above, styryl, vinyl, allyl, chloroallyl, cyclohexenyl, and radicals of the formula

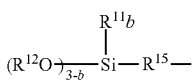

wherein $R^{11}$ and $R^{12}$ are monovalent hydrocarbon radicals containing up to about 8 carbon atoms, where $R^{13}$ is a monovalent hydrocarbon radical containing up to about 8 carbon atoms or a monovalent cyanoalkyl radical containing up to 8 carbon atoms, and wherein $R^{15}$ is a divalent hydrocarbon radical selected from the group consisting of alkylenearylene, alkylene, and cycloalkylene and halogenated alkylenearylene, alkylene, and cycloalkylene each containing from 2 to about 12 carbon atoms, and where b is 0 or an integer from 1 to 2; and, combinations thereof;

an elastomer; and, at least one substrate selected from the group consisting of a construction sheathing substrate, a metal substrate, a galvanized metal substrate and a wood framing substrate, wherein the adhesive bonds the elastomer to the substrate.

2. The composition of claim 1 further comprising up to about 60 wt % of a hydrocarbon processing aid.

3. The composition of claim 2 wherein the hydrocarbon processing aid, comprises greater than 40 weight percent cyclic paraffinic hydrocarbons and less than 60 weight percent noncyclic paraffinic hydrocarbons based on the total weight of the hydrocarbon processing aid.

4. The composition of claim 3 wherein the cyclic paraffinic hydrocarbons are selected from the group consisting of cyclohexane, cyclooctane, cyclononane, and cyclododecane and combinations thereof.

5. The composition of claim 3 wherein the non-cyclic paraffinic hydrocarbons are selected from the group consisting of n-heptane, n-octane, iso-octane, n-nonane, n-decane, n-undecane, n-dodecane, iso-decane, n-heptadecane, n-octadecane, n-eicosane, isoeicosane and combinations thereof.

6. The composition of claim 1 wherein the silanol-terminated diorganopolysiloxane polymer is of the general formula:

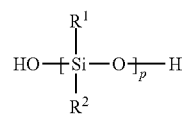

where $R^1$ and $R^2$ are monovalent hydrocarbon radicals containing up to about 12 carbon atoms, and where "p" varies such that the viscosity of the polymer varies from about 100 centipoise to about 500,000 centipoise at 25 C.°.

7. The composition of claim 1 wherein p is from 10 to about 4000.

8. The composition of claim 1 wherein the polyalkoxy silane crosslinking agent is selected from the group consisting of methyltrimethoxysilane, vinyltrimethoxysilane, tetramethoxysilane, methyltriethoxysilane, vinyltriethoxysilane and tetraethoxysilane.

9. The composition of claim 1 wherein Me is titanium.

10. The composition of claim 1 wherein $R^6$ is propylene, $R^3$ is hydrogen, $R^2$ and $R^4$ are methyl and $R^5$ is ethyl.

11. The composition of claim 1 wherein the metal chelate condensation catalyst is of the general formula:

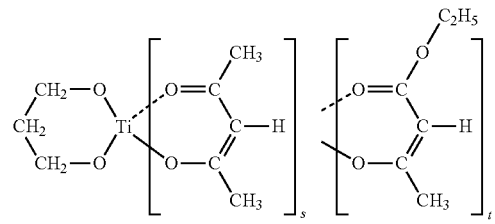

wherein Ti is titanium and s and t are each 1.

12. The composition of claim 1 wherein the adhesion promoter is selected from the group consisting of 1,3,5-tristrimethoxysilylpropylisocyanurate, bis-1,3-trimethoxysilylpropylisocyanurate, 1,3,5-tristrimethoxysilylethylisocyanurate, 1,3,5-trismethyldimethoxysilylpropylisocyanurate, 1,3,5-trismethyldiethoxysilylpropylisocyanurate, n-2-aminoethyl-3-aminopropyltriethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and combinations thereof.

13. The composition of claim 1 wherein the adhesion promoter is 1,3,5-tristrimethoxysilylpropylisocyanurate.

14. The composition of claim 1 further comprising at least one of a flame retardant, a fungicide, a pigment and a colorant.

* * * * *